(12) United States Patent
Gu et al.

(10) Patent No.: US 7,864,251 B2
(45) Date of Patent: Jan. 4, 2011

(54) SYSTEM AND METHOD FOR DECREASING END-TO-END DELAY DURING VIDEO CONFERENCING SESSION

(75) Inventors: Qunshan Gu, Londonderry, NH (US); Juan Rojas, San Jose, CA (US)

(73) Assignee: Polycom, Inc., Pleasanton, CA (US)

( * ) Notice: Subject to any disclaimer, the term of this patent is extended or adjusted under 35 U.S.C. 154(b) by 1115 days.

(21) Appl. No.: 11/549,914

(22) Filed: Oct. 16, 2006

(65) Prior Publication Data

US 2007/0116111 A1    May 24, 2007

Related U.S. Application Data

(62) Division of application No. 10/448,810, filed on May 30, 2003.

(60) Provisional application No. 60/384,606, filed on May 31, 2002.

(51) Int. Cl.
*H04N 9/64* (2006.01)
(52) U.S. Cl. ..................... 348/715; 345/547
(58) Field of Classification Search ......... 348/714–719, 348/567, 565, 513; 345/545, 547
See application file for complete search history.

(56) References Cited

U.S. PATENT DOCUMENTS

| | | | | |
|---|---|---|---|---|
| 5,406,311 A | * | 4/1995 | Michelson | 345/547 |
| 5,568,165 A | * | 10/1996 | Kimura | 345/547 |
| 6,542,198 B1 | | 4/2003 | Hung et al. | |
| 6,581,164 B1 | | 6/2003 | Felts, III et al. | |
| 6,614,441 B1 | * | 9/2003 | Jiang et al. | 345/539 |
| 6,658,056 B1 | | 12/2003 | Duruoz et al. | |
| 6,891,894 B1 | | 5/2005 | Kim et al. | |
| 7,068,847 B1 | | 6/2006 | Chen | |

* cited by examiner

*Primary Examiner*—M. Lee
(74) *Attorney, Agent, or Firm*—Wong, Cabello, Lutsch, Rutherford & Brucculeri, L.L.P.

(57) ABSTRACT

A method for decreasing end-to-end delay in a video conferencing context is disclosed. At video conferencing system startup, a processor is initialized to receive either a top field or a bottom field of video frame data. If the first line of a new field arriving after initialization does not match a field state that the processor is initialized to, the present invention senses the state mismatch and adjusts a display buffer by one display line, and the field is stored in the display buffer. The display buffer is adjusted in order to preserve a vertical spatial relationship between the top and bottom fields.

10 Claims, 3 Drawing Sheets

First Case

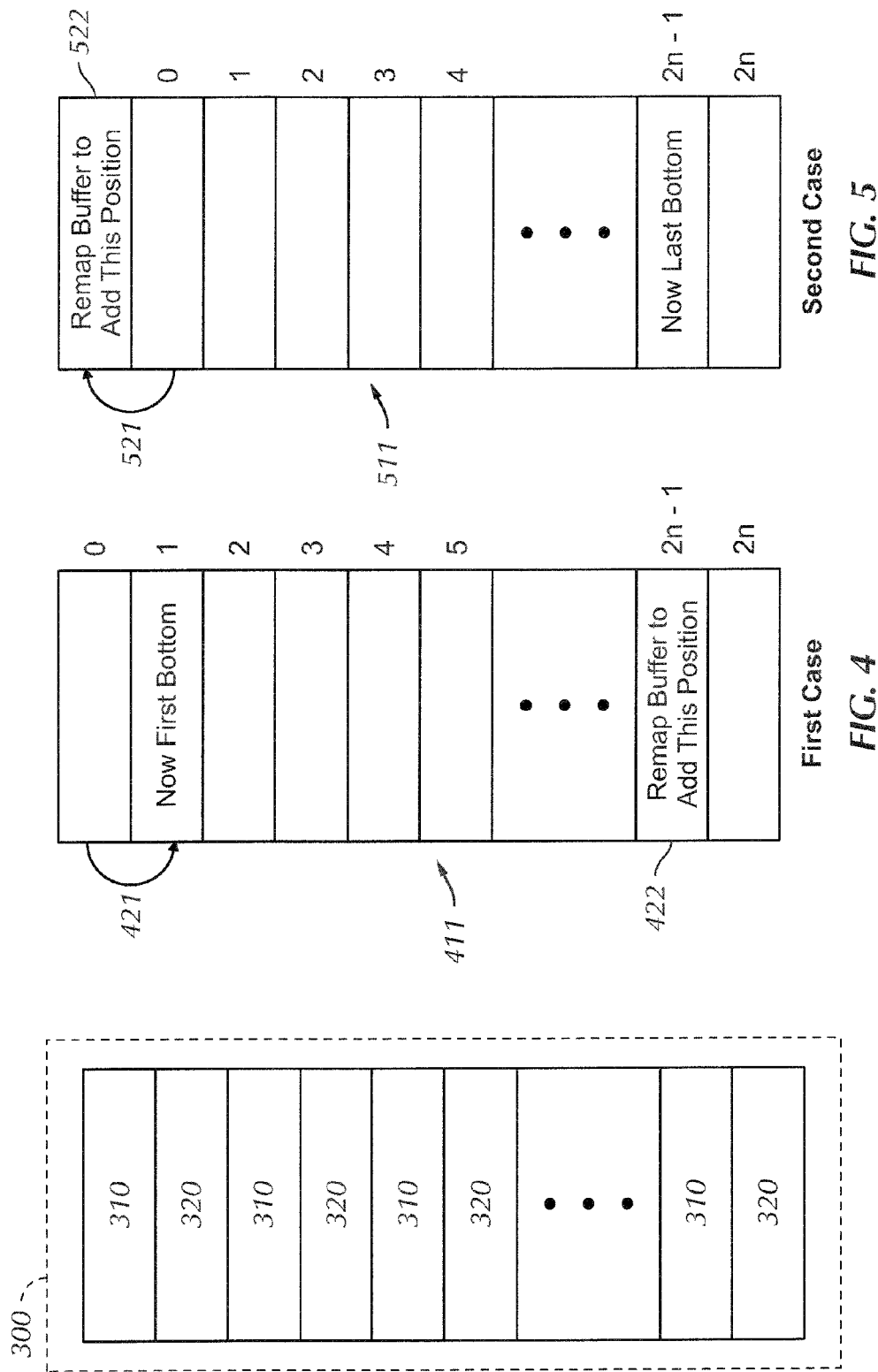

SYSTEM AND METHOD FOR DECREASING END-TO-END DELAY DURING VIDEO CONFERENCING SESSION

RELATED APPLICATIONS

This application is a Divisional of U.S. patent application Ser. No. 10/448,810 filed May 30, 2003 which claims the benefit under 35 U.S.C. §119(e) of U.S. Provisional Patent Application No. 60/384,606, filed May 31, 2002, which is incorporated herein by reference.

BACKGROUND OF THE INVENTION

1. Field of the Invention

The present invention relates generally to video conference systems, and more particularly to decreasing end-to-end delay during video conferencing sessions.

2. Description of the Related Art

The well-known National Television Standards Committee (NTSC) and Phase Alternating Line (PAL) television standards are employed by video cameras and monitors to capture and display video information for consumer applications. Both NTSC and PAL cameras and monitors capture and display video information in an interlaced format. Interlacing refers to a method of capturing two fields of video information per frame. One half of a vertical resolution of a frame (i.e., every other horizontal line) is captured in a first or "top" field. A remaining half of the vertical resolution of the frame is captured in a second or "bottom" field. Each frame of a video picture produced by the NTSC camera or displayed by the NTSC monitor is displayed in a 480-line format with each line having 720 pixels, while the PAL format is displayed in 576 lines. The NTSC video is transmitted at 60 frames per second and, the PAL video is transmitted at 50 frames per second. Adaptations of these formats have been adopted for emerging high-definition television as well.

Typically, the NTSC or PAL cameras and monitors are used in conjunction with video conferencing systems that implement the International Telecommunications Union (ITU) Telecommunications (ITU-T) H.263 standard (incorporated herein by reference in its entirety, including all annexes, appendices, and subparts thereof), since such devices are much less expensive than equipment that captures video information using progressive (non-interlaced) scan technology. Until recently, however, the H.263 standard did not directly support interlaced video transmission, but supported Common Intermediate Format (CIF), which is a non-interlaced frame consisting of 288 lines of 352 pixels each. Transmission rate for CIF video can be as high as 30 frames per second. Thus, video conference systems had to convert from NTSC (or PAL) into CIF before coding each input video frame. Such a conversion discards some spatial and temporal information, and thus degrades the picture quality. In this context the "spatial information" is the pixels in both vertical and horizontal directions that are not included in the CIF frame. Likewise, the discarded "temporal information" represents the fact that a 50 or 60 frame per second (fps) transmission of the NTSC or PAL standard is down-sampled to 30 fps in the CIF format.

In recent years, cost of hardware and transmission bandwidth required for coding and transmitting interlaced video pictures has decreased. It is now considered economically practical for a video conferencing system to code interlaced pictures with a full spatial dimension of NTSC or PAL input sources. The ITU has addressed this change in technology by adding Annex W to the H.263 standard.

Annex W describes how interlaced video signals can be encoded and decoded when transmitted in a single stream (or channel) of video information. The Annex W video encoding (or simply "coding") scheme utilizes a reference frame from one field to predict a picture of another field. However, a top field in an interlaced video transmission scheme is a poor predictor of a bottom field and vice versa. Thus, using the top field to predict the bottom field can lead to poor picture quality during times of low motion.

This particular form of picture quality degradation is due to the fact that the camera creates a complete picture frame by first scanning for top field information and then scanning for bottom field information. Each field is thus separated spatially (by one line) and temporally (by the refresh period between the end of the top field and the end of the bottom field). This temporal and spatial separation can result in display jitter, which is more noticeable during times of low motion. With this problem in mind, Section W.6.3.11 of Annex W suggests that Annexes N or U of H.263 can be used to predict from more than one previous field. For example, two or three previous fields can be used to form a prediction of the next field. In particular, the field (or fields) to be used for prediction can be chosen (according to Annexes N or U) such that each top field is always predicted from the previous top field (or fields) and each bottom field is always predicted from the previous bottom field (or fields). In this way, the top field can be coded and transmitted in a stream completely separate from the stream containing the bottom field. Using the video information from the same field for prediction thus mitigates the picture quality problem described above.

This field prediction scheme is also more resilient to errors. If one stream of video information is temporarily dropped, the other stream can continue. Since one field remains, there is always some video information to decode and display, albeit at a slower update rate.

Further, more than one processor may be used to more efficiently encode a video stream in a multiple-processor architecture. For example, one processor can code the stream of top fields, and a second processor can code the stream of bottom fields, where each processor is programmed to capture and encode either the top or bottom field of video information. Each processor may receive both streams of top or bottom fields and decode one. Conversely, the video conferencing system may be configured such that each processor only receives one of the field streams.

Several shortcomings exist in the above-described systems. Firstly, dropped fields, caused by large amounts of motion or by transmission errors occurring in any one of the video signal transmission streams, can affect the quality of the displayed picture for an extended period of time. In such cases, the picture quality remains poor until the coding process recovers. For instance, if a field of information is lost during transmission for any reason, and a decoder signals an encoder to encode an "Intra" field (the use of Intra fields described within the H.263 standard), the quality of that half of the picture (i.e., the lost field) will suffer for a period of time that it takes the encoder to recover from the error and/or encode the Intra frame.

Another shortcoming of prior art systems is that the field that the encoder begins encoding with (at start up) is indeterminate. The receiving video conference system does not know a priori whether the first frame to be received will begin with a top field or a bottom field. This is so because, at the transmitting video conference terminal, the video camera starts generating and sending fields of video information before the encoder is ready to receive the information. After the encoder is itself initialized, the encoder begins processing at the beginning of the next field it sees.

This situation can cause additional and unacceptable transmission delay. If the received video stream begins with the same field that the encoder was initialized to expect, there are no problems and no added delay in subsequent encoding. If, however, the encoder receives the opposite field than the one that is expected, the encoder will wait (i.e. delay) for as much as an entire field capture time (e.g. 16.7 milliseconds) in order to receive and store the expected field. This image delay will prevail for the entire video conferencing session. Such a systematic delay can lead to unacceptable meeting dynamics and misunderstood conversations.

In a dual processor implementation, each processor is programmed to capture and encode either the top or the bottom field of video information (i.e. each processor receives both fields of video, however, both fields are not captured and encoded). Generally, at system start time, the encoder randomly sends either the top or bottom field of video information first. Specifically, at the time that the video conferencing system is started, either the top or the bottom field of video can be available to either of the two processors. This is because the video camera starts generating and sending fields of video information prior to the processors being ready to receive video information, and the processors will capture the first field that is available after initialization.

The first field that the decoder receives can be indeterminate for other reasons as well. For instance, bit errors contained in a field can also cause the field to be dropped at the decoder or lost in the network. At startup, an interrupt is generated by the decoder which has an effect of preparing the decoder to receive either the top or bottom field of video (actually the routine that services this interrupt determines which field the pointer will be initialized to). In some systems, one interrupt is generated every 16.7 msec (NTSB) or 20 msec (PAL), which is a period of time it takes to display one field of information. As a result of this interrupt, a display buffer pointer is set to a particular memory location. This location could, for instance, correspond to a first line (i.e., line 0) of the top field of video information. During normal operation, the display buffer pointer is changed by the processor whenever the processor services the interrupt. This interrupt is generated during a vertical blanking period (i.e., the period during which the monitor scanning moves back to the top of the display screen). The receipt and servicing of this interrupt results in the pointer being moved from a starting position (i.e., either top or bottom field location) to a second position (i.e., either bottom or top field location, respectively). Disadvantageously, if the first field that the encoder captures, encodes, and transmits is not the field that the decoder buffer pointer was initialized to, then the decoder must wait one full encoder capture period (e.g., 16.7 msec) for the next field to arrive. This wait adds 16.7 msec of end-to-end video delay to the system. When the total end-to-end video delay ranges from 150 to 200 msec due to bandwidth availability and network delay, removing 16.7 msec is significant.

Since the first field that the decoder receives at the start of a video conference session is not determinate, the decoder may have to wait one field capture time (e.g., 16.7 msec) to store the next field in the display buffer, therefore delaying display of the image. This video image delay prevails for the entire video conferencing session.

One of the main problems with end-to-end video delay is that the delay affects video meeting dynamics. One example of a meeting dynamics problem is if a local person makes a statement and is watching a remote meeting participant waiting for a response and the response is delayed to a point that the local person is not sure whether or not the remote participant understood the statement. Another example is if the local person is listening to the participant and is also waiting for an opportunity to break in to ask a question. If, at the same time, a second remote person is also waiting to break in, in all probability, the second remote person will do so before the local person is aware that the first remote participant has stopped talking. So, in effect, people interrupt one another during a meeting in an "uncontrolled" manner. As this is the case, it is very desirable to have the end-to-end delay time be as short as possible, therefore giving the meeting as "natural" a feeling as possible.

Therefore there is a need for a method that avoids introduction of additional delay in a video conferencing session.

SUMMARY OF THE INVENTION

The present invention provides in various embodiments a method for decreasing end-to-end delay in a video conferencing context. According to one embodiment of the present invention a processor is initialized to receive an initial field of video frame data having a first state. The processor receives an initial field of video frame data having either a first state or a second state. If the state of the initial field of video frame data is not the same as a state that the processor is initialized to, then a display buffer is adjusted by one display line, and the initial field of video frame data having a second state is stored in the display buffer.

According to another embodiment of the present invention, a method is provided for decreasing end-to-end delay in a video conferencing context, where at least one buffer pointer is initialized to either a first state or a second state to form a first initialized buffer pointer. The first state is associated with a top field of the video frame data, and the second state is associated with a bottom field of the video frame data. An initial field of video frame data is received having either the first state or the second state. If the state of the initial field of video frame data is not the same as the state of the first initialized buffer pointer, the state of the first initialized buffer pointer is toggled, and the first received field is stored into a buffer using the first initialized buffer pointer.

A further understanding of the nature and advantages of the inventions herein may be realized by reference to the remaining portions of the specification and the attached drawings.

BRIEF DESCRIPTION OF THE DRAWINGS

The foregoing and other advantages of the invention will be appreciated more fully from the following further description thereof and with reference to the accompanying drawings, wherein:

FIG. 3 shows a display format for PAL standards.

FIG. 4 shows a schematic representation of the organization of a video frame buffer where the display buffer pointer is initialized to the top field and the bottom field is received first.

FIG. 5 shows a schematic representation of the organization of a video frame buffer where the display buffer pointer is initialized to the bottom field and the top field is received first.

The use of the same reference symbols in different drawings indicates similar or identical items.

DETAILED DESCRIPTION OF THE PREFERRED EMBODIMENTS

Introduction

To provide an overall understanding of the present invention, certain illustrative embodiments will now be described in the context of an ITU Standard H.263 video conferencing system.

It will be understood by those of ordinary skill in the art that the methods and systems described herein may be suitably adapted to other video coding techniques, such as Moving Picture Experts Group (MPEG) standards, Audio Visual Interleave (AVI), or Multiple Image Network Graphics (MNG). All such adaptations and modifications that would be clear to one of ordinary skill in the art are intended to fall within the scope of the invention described herein.

Furthermore, although the term "coding" is used herein, those of ordinary skill in the art will appreciate that the reciprocal decoding function is also implicated in the use of present invention. Accordingly, all references to coding techniques are to be understood to include decoding techniques unless specifically identified otherwise.

As used herein, terms such as "image", "image data", "picture", "picture data", "video", "video data", and "video stream" are intended to refer generally to any form of video data, unless specifically stated otherwise. This includes reference images (which may, for example, be represented or described in terms of luminance and chrominance data), differential data, motion vectors, sequential identifiers, and any other coding and control information, whether relating to blocks, macro-blocks, frames, or any other partial or complete image representation, however encoded.

Figure 1:
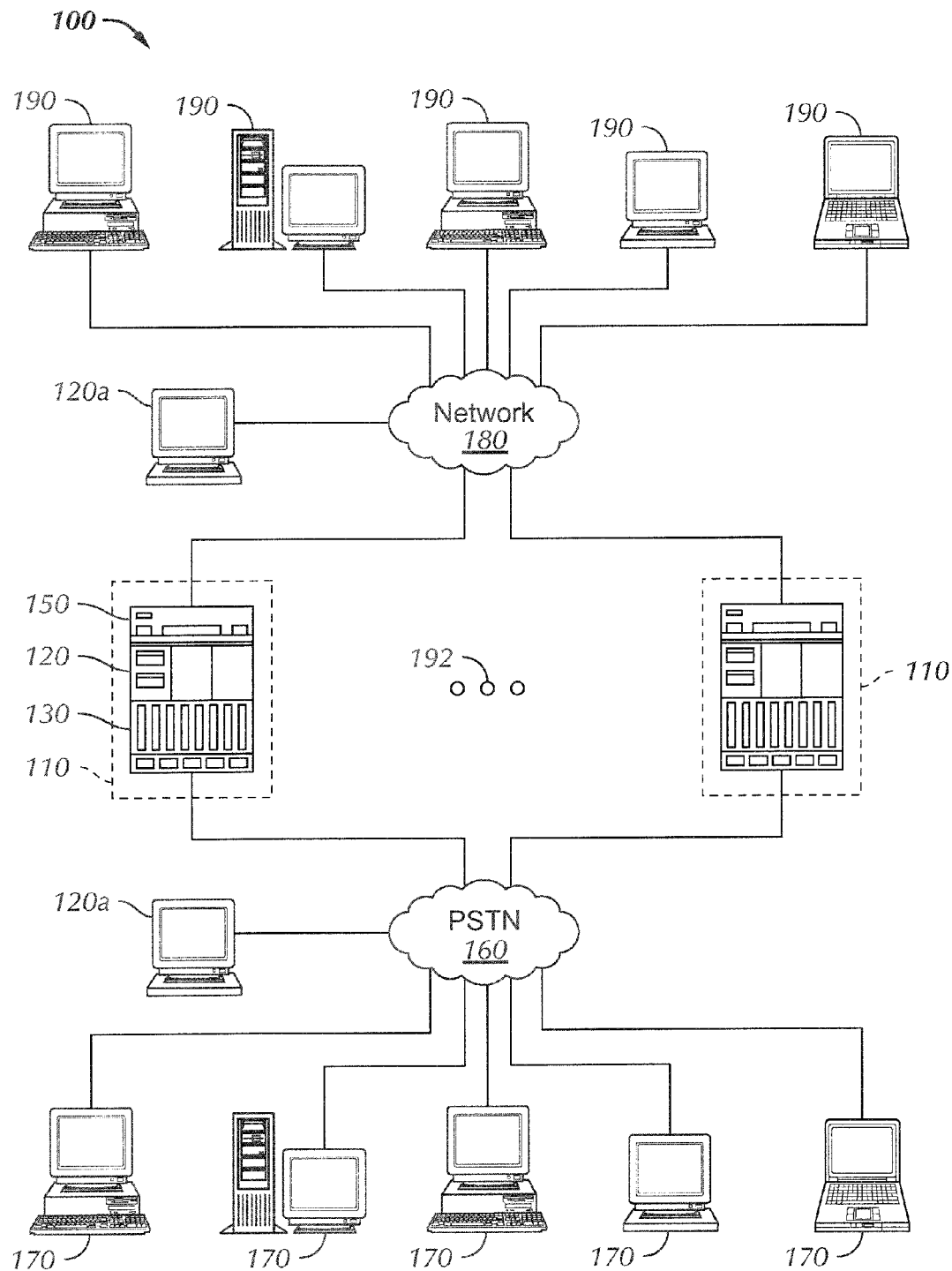
FIG. 1 shows an exemplary video conferencing system that may be used with the present invention.

Referring to FIG. 1 an exemplary video conferencing system that may be used with the present invention is shown. In a video conferencing network 100, a rack 110 may include a multi-point conference unit ("MCU") 120, a gateway 130, and hardware/software for other services 150. The gateway 130 may provide one or more connections to a Public Switched Telephone Network 160, for example, through high speed connections such as Integrated Services Digital Network ("ISDN") lines, T1 lines, or Digital Subscriber Lines ("DSL"). Multiple PSTN video conferencing terminals 170 may also be connected in a communicating relationship with the PSTN 160, and may be accessible using known telecommunications dialing and signaling services.

The MCU 120 may also be connected in a communicating relationship with a network 180. Multiple Internet Protocol ("IP") video conferencing terminals 190 may also be connected in a communicating relationship with the network 180, and may be accessible using known data networking techniques, such as IP addressing.

It will be appreciated that, although the following description refers to the network 180 (e.g., an IP network such as the Internet) and the PSTN 160, any network for connecting terminals may be usefully employed according to the principles of the present invention. The network 180, for example, may be any packet-switched network, a circuit-switched network (such as an Asynchronous Transfer Mode ("ATM") network), or any other network for carrying data including the well-known Internet. The network 180 may also be the Internet, an extranet, a local area network, or other networks of networks known in the art. Further, the PSTN 160 may likewise be any circuit-switched network, or any other network for carrying circuit-switched signals or other data. It is additionally appreciated that the PSTN 160 and/or the network 180 may likewise include wireless portions, or may be completely wireless networks. Finally, the principles of the present invention may be usefully employed in any multimedia system.

It will also be appreciated that the components of the rack 110, such as the MCU 120, the gateway 130, and the other services 150, may be realized as separate physical machines, as separate logical machines on a single physical device, as separate processes on a single logical machine, or some combination of these. Further, a single, physical rack device is not required. Additionally, each component of the rack 110, such as the gateway 130, may comprise a number of separate physical machines grouped as a single logical machine, as for example, where traffic through the gateway 130 exceeds data handling and processing power of a single machine. A distributed video conferencing network may include a number of racks 110, as indicated by ellipsis 192.

Each PSTN video conferencing terminal 170 may use an established telecommunications video conferencing standard such as H.320. Further, each IP video conferencing terminal 190 may use an established data networking video standard such as H.323. H.320 is an ITU-T standard for sending voice and audio over the PSTN 160, and provides common formats for compatible audio/video inputs and outputs, and protocols that allow a multimedia terminal to utilize the communications links and synchronize audio and video signals. The T.120 standard may also be used to enable data sharing and collaboration. The ITU-T, H.320, and T.120 standards are incorporated herein by reference in their entireties.

The gateway 130 may communicate with the PSTN 160, and may translate data and other media between a form that is compatible with the PSTN 160 and a form that is compatible with the network 180, including any protocol and media translations required to transport media between the networks.

Figure 2:
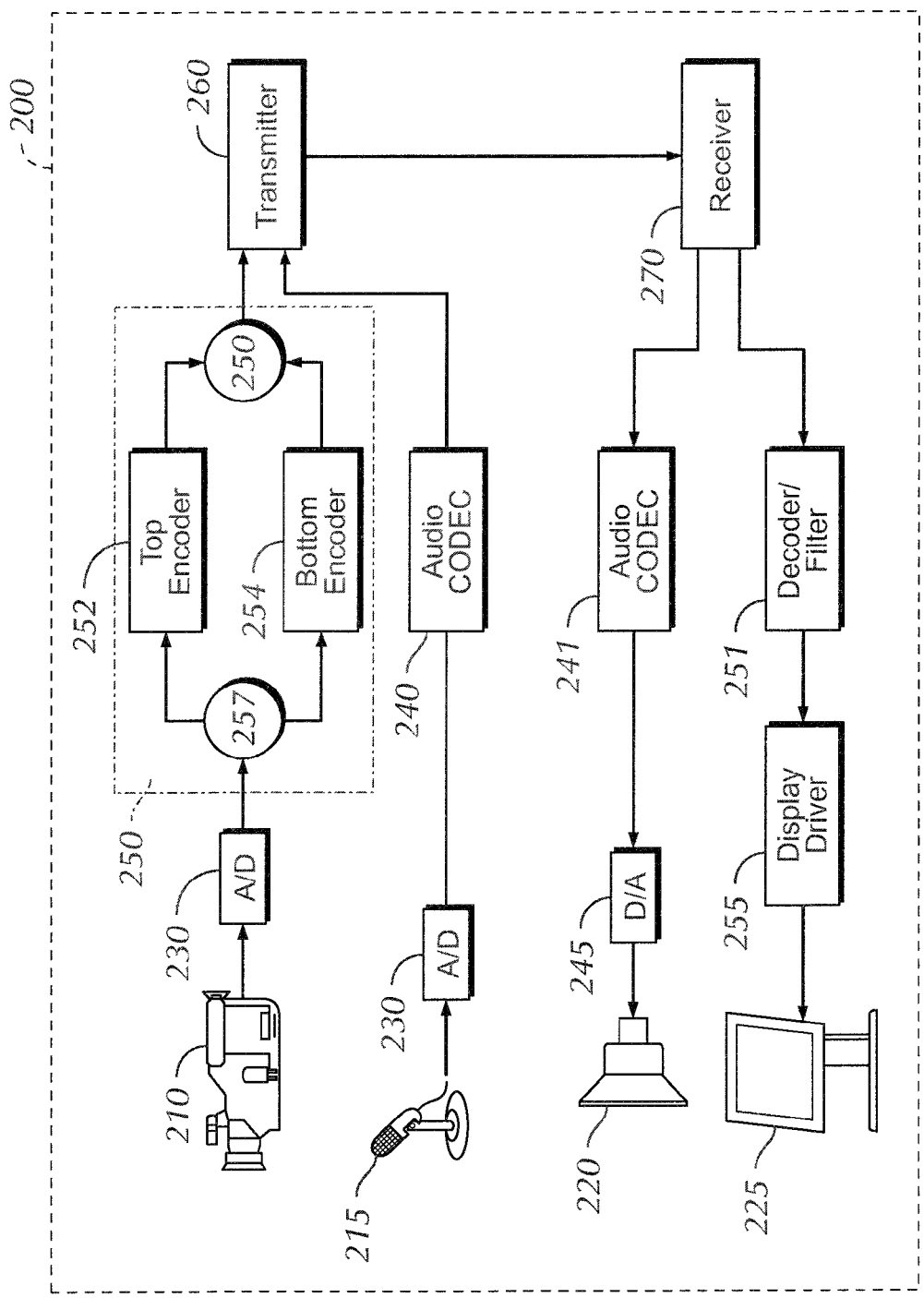
FIG. 2 shows an exemplary high-level schematic view of elements of a video conference terminal.

Referring now to FIG. 2, some major components of a video conferencing terminal 200 suitable for use with either a PSTN or an IP network are shown in a high-level schematic form. The terminal 200 may include input devices such as a video camera 210, a microphone 215, a keyboard (not shown), and a pointing device (not shown). The terminal 200 may also include output devices such as a speaker 220 and a display system 225. Those of ordinary skill in the conferencing arts will also recognize that additional input and output devices, including but not limited to overhead projectors, projection video systems, and whiteboards, may also be used as components within the video conferencing terminal 200.

The video conferencing terminal 200 also may contain analog to digital converters ("A/D") 230 for converting analog input signals from one or more sources into a digital form for encoding. An audio coder/decoder ("codec") 240, which may include A/D converter 230 functionality, encodes audio signals for transmission via a transmitter 260. Similarly, a video codec 250 performs analogous functions for video signals.

In an exemplary embodiment, the video codec 250 comprises separate encoders 252 and 254 for top and bottom video fields that make up each video frame, respectively. The video codec 250 may also include a field splitter 257, combiner/multiplexer 259 functions, and A/D converter function 230, depending on the type and output signal characteristics of the camera 210. Typically, functional blocks 230, 257, 252, 254, and 259 are present in all video encoding systems, and the present description is intended only to convey a functional overview of video signal processing rather than a working schematic.

While those of ordinary skill in the art will readily recognize the function of a codec, as used herein the term "codec"

is not limited to a device or subsystem that performs coding and decoding simultaneously. Instead, the term "codec" is here in used to refer to aggregated functions of coding (or encoding) and decoding, which may be performed exclusively or in combination in one or more physical devices. Thus, in certain instances the term "encoder" (or its equivalent, "coder") is used to connote the encoding function only. In other instances, the term "decoder" is used to connote the decoding function. In still other contexts, the term "codec" may be used as a generalization of either or both functions.

The video codec 250 and the audio codec 240 (and their counterpart codecs 251 and 241 in the receiving path of the terminal 200, respectively) provide standards-based conferencing according to the H.320 and T.120 standards for PSTN terminals or H.323 standard for IP terminals. These standards may be implemented entirely in software on a computer (not shown), on dedicated hardware, or in some combination of both.

The terminal 200 also includes a receive path, comprised of a network receiver 270, the audio codec 241 and the video codec 251. The video codec 251 may include a display driver function, or that function may be implemented separately in a display driver 255, as illustrated. Likewise, the audio codec 240 may include a digital to analog ("D/A") converter, or the D/A converter function may be provided externally, as in a D/A converter 245.

Referring to FIG. 1, the MCU 120 may communicate with the IP video conferencing terminals 190 over the network 180 or with PSTN video conferencing terminals 170 over the PSTN 160. The MCU 120 may also include hardware and/or software implementing the H.323 standard (or the H.320 standard, where the MCU 120 is connected to the PSTN 160) and the T.120 standard, and may also include multipoint control for switching and multiplexing video, audio, and data streams in a multimedia conference. The MCU 120 may additionally include hardware and/or software to receive from, and transmit to, the PSTN video conferencing terminals 170 connected to gateway 130.

The MCU 120 may reside on one of the racks 110 (as shown in FIG. 1) or may be located elsewhere in the network, as are the MCU's 120a and 120b. It will be appreciated that the MCU 120 may also reside in one of the PSTN video conferencing terminals 170, or one of the IP video conferencing terminals 190, and may be implemented in hardware, software, or some combination thereof.

The rack 110 may provide additional services for use in a video conference. These may include, for example, audio/video codecs that are not within the H.323 or H.320 standards, such as the G2 codec and streamer for use with a proprietary streaming system sold by RealNetworks, Inc., or a Windows Media codec for use with proprietary media systems sold by Microsoft Corporation. Other services may include, for example, a directory server, a conference scheduler, a database server, an authentication server, and a billing/metering system.

Video codecs may include codecs for standards such as H.261 FCIF, H.263 QCIF, H.263 FCIF, H.261 QCIF, and H.263 SQCIF. video teleconferencing standards define different image size and quality parameters. Further, audio codecs may include codecs for standards such as G. 711, G.722, G.722.1, and G.723.1. These audio teleconferencing standards define audio data parameters for audio transmission. Any other proprietary or non-proprietary standards currently known or that may be developed in the future for audio, video, and data may likewise be used with the present invention, and are intended to be encompassed by this description. For example, current H.320 devices typically employ monaural sound; however, the principles of the invention may be readily adapted to a conferencing system employing stereo coding and reproduction, or any other spatial sound representation. Each and every standard recited herein is hereby incorporated by reference in its entirety, including any and all appendices, annexes, and subparts thereof, as if it were set forth herein.

Delay Avoidance

Referring to FIG. 2, video conferencing delay is avoided by ensuring that each received field is stored in a local video buffer memory (i.e., at the transmit video conferencing terminal or the receive video conferencing terminal, as appropriate) without loss of any fields due to a mismatch between the initialized state of the video buffer pointer and the state of the first received video field. "State" in the context of this application refers to the association of both the video buffer pointer and contents of a received video field with one of two types of fields (i.e., a top or a bottom field). A particular instance of a buffer pointer identifying a buffer location at which to begin storing the top field of a received video frame has a "top" state; the instance of a pointer identifying a buffer for the bottom field has a "bottom" state. Likewise, the video data first received after initialization of the camera 210 and the encoder 250 (or the receiver 270 and the decoder 251, at the receiving video conferencing terminal) is always the first line of either the top field or the bottom field, by common definition of the interlaced video standards. First received datum in a given field (or the beginning of a field, generally) is thus referred to herein as having either a "top" or "bottom" state, respectively.

At video conferencing system startup, both the video encoder 250 and the video decoder 251 are initialized to receive either a top field or a bottom field of video frame data. As part of this initialization, a display buffer pointer is set to a particular memory location at each video conferencing terminal (or "end" of the conference), corresponding, for example to the first line of the top field of video information. A second display buffer and its associated pointer are maintained by a local processor for the bottom field. Alternatively, a second, separate processor can be employed to buffer alternating fields.

As field information is received by the video conferencing system (either from the local camera 210 or from a transmitting terminal), the data is temporarily stored (i.e., buffered) in the local display buffer. During normal operations, the display buffer pointer is changed by the processor during a vertical blanking period of each frame to reset the pointer to a beginning of the buffer in preparation for the next field. For example, if the first field received is a top field, the display buffer pointer must be reset to the beginning of the bottom field buffer after the top field has been displayed.

Regardless of the initial state of the display buffer pointer, if the first line of a new field arriving after initialization is not what was expected (i.e., does not match the field state of the buffer pointer), the present invention senses the state mismatch, and dynamically resets the buffer pointer to point to the correct buffer. Since the buffer pointer has only two possible states (i.e., pointing to the top field or the bottom field), a dynamic reset can take the form of a state toggle.

Referring to FIG. 3 an example of a display format for PAL standards 300 is shown. At video conferencing system startup, both the video encoder 250 (FIG. 2) and the video decoder 251 (FIG. 2) are initialized to receive either a top field 310 or a bottom field 320 of video frame data. As part of this initialization, a display buffer pointer is set to a particular memory location at each video conferencing terminal corresponding to the first line of a field of video information. A second display buffer and its associated pointer can be maintained by the local processor for the bottom field. Alternatively, a second, separate processor may be employed to buffer alternating fields.

The video processor senses the received field state when the video processor decodes the video and picture layer information. In particular, a PSUPP field in the picture layer of an H.263-complaint video signal contains, within the Picture Message (function type [FTYPE] 14), an indication of whether the field is the top field 310 or the bottom field 320. The PSUPP field is, itself, fully described in section W.63 of Annex W to the H.263 standard, and is thus well-known to persons of ordinary skill in the art.

As field information is received by the video conferencing terminal 170 (FIG. 1) from a local camera or from a transmitting terminal, the data may be temporarily stored (buffered) in the local display buffer by the terminal's video processor. During normal operations, the display buffer pointer is changed by the processor during the vertical blanking period of each frame to reset the pointer to the beginning of the buffer in preparation for the next field. For example, if the first field received is the top field 310, the display buffer should be reset to the beginning of the bottom field buffer after the top field 310 has been displayed.

Regardless of the initial state of the display buffer pointer, if the first line of a new field arriving after initialization (the "initial field") does not match the field state of the buffer pointer, the video processor senses the state mismatch, and dynamically resets the buffer pointer to point to the correct buffer, examples of which are shown in FIGS. 4 and 5. Where, as in PAL or NTSC video, the buffer pointer has only two possible states (i.e., pointing to the top field or the bottom field), this "dynamic reset" can take the form of a state toggle.

The buffer pointer can be initialized to either a first state or a second state. The first state associated with the top field 310 and the second state associated with the bottom field 320 of video frame data. Referring to FIG. 4, a schematic representation of an organization of an exemplary embodiment of a video frame buffer 411, where the display buffer pointer is initialized to the top field 310 (FIG. 3) and the bottom field 320 (FIG. 3) is received first, is shown. In this scenario, because the state of the initial field of video frame data is not the same as the state of the first initialized buffer pointer, the state of the first initialized buffer pointer is toggled 421, and the first received field is stored into a buffer using the first initialized buffer pointer. In other words, the processor will immediately cause the display buffer pointer to reposition the display lines such that a vertical spatial relationship between top and bottom lines is preserved. In this embodiment, the toggling 421 can be a change of state of the first initialized buffer pointer or the replacement of the first initialized buffer pointer with a second initialized buffer pointer having a state different from the state of the first initialized buffer pointer.

Other embodiments not heavily dependent on buffer pointers and their adjustment exist. In such a case, the processor is initialized to receive an initial field of video frame data having a first state, but the processor receives an initial field of video frame data having a second state. The display buffer is then adjusted by one display line, and the initial field of video frame data having a second state is stored into the display buffer. As shown in FIG. 4, the first state is the top field 310, and the second state is the bottom field 320. Therefore, the display buffer is adjusted down one display line. At this moment, the display buffer 411 is remapped for an additional position 422. The toggling 421, in this embodiment, is the adjustment of the display position of the fields by one line downward such that, although bottom field 320 lines go into top field 310 lines in the display buffer, the vertical spatial relationship between top field 310 and bottom field 320 lines is preserved.

Referring to FIG. 5, a schematic representation of an organization of an exemplary embodiment of a video frame buffer 511, where the display buffer pointer is initialized to the bottom field 320 (FIG. 3) and the top field 310 (FIG. 3.) is received first, is shown. In this embodiment, because the state of the initial field of video frame data is not the same as the state of the first initialized buffer pointer, the state of the first initialized buffer pointer is toggled 521, and the first received field is stored into a buffer using the first initialized buffer pointer. In other words, the processor will immediately cause the display buffer pointer to reposition the display lines such that the vertical spatial relationship between top and bottom lines is preserved. In this embodiment, the toggling 521 can be a change of state of the first initialized buffer pointer, or the replacement of the first initialized buffer pointer with a second initialized buffer pointer having a state different from the state of the first initialized buffer pointer.

Other embodiments not heavily dependent on buffer pointers and their adjustment exist. In such a case, the processor is initialized to receive an initial field of video frame data having a first state, but the processor receives an initial field of video frame data having a second state. As shown in FIG. 5, the first state is the bottom field 320 and the second state is the top field 310. Therefore, the display buffer is adjusted up one display line. At this moment, the buffer is remapped to add an additional position 522. The toggling 521 in this embodiment is the adjustment of the display position of the fields by one line upward such that, although top field 510 lines go into bottom field 520 lines in the display buffer, the vertical spatial relationship between top field 510 and bottom field 520 lines is preserved.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within Web pages transferred among devices connected to the Internet. Accordingly, the present invention is not limited to any particular platform, unless specifically stated otherwise herein.

The above description is illustrative and not restrictive. Many variations of the invention will become apparent to those skilled in the art upon review of this disclosure. The scope of the invention should therefore be determined not with reference to the above description, but instead should be determined with reference to the appended claims along with their full scope of equivalents.

We claim:

1. A method of buffering video frame data in a video display system, comprising:
   initializing at least one buffer pointer to either a first state or a second state to form a first initialized buffer pointer;
   receiving an initial field of video frame data having either the first state or the second state;

if a state of the initial field of video frame data is not the same as a state of the first initialized buffer pointer, toggling the state of the first initialized buffer pointer; and storing the received initial field of video frame data into a buffer using the first initialized buffer pointer.

2. The method of claim 1, wherein the first state is associated with a top field of the video frame data and the second state is associated with a bottom field of the video frame data.

3. The method of claim 1, wherein the toggling further comprises changing the state of the first initialized buffer pointer.

4. The method of claim 1, wherein the toggling further comprises replacing the first initialized buffer pointer with a second initialized buffer pointer having a state different from the state of the first initialized buffer pointer.

5. The method of claim 1, further comprising sequentially storing subsequent received fields according to the state of each of the subsequent received field in the display buffer.

6. The method of claim 1, further comprising displaying the video frame data by reading the received fields from the display buffer.

7. An electronically readable medium having embodied thereon a program, the program being executable by a machine to perform method steps for use in buffering video frame data in a video display system, comprising:

initializing at least one buffer pointer to either a first state or a second state to form a first initialized buffer pointer;

receiving an initial field of video frame data having either the first state or the second state;

if a state of the initial field of video frame data is not the same as a state of the first initialized buffer pointer, toggling the state of the first initialized buffer pointer; and storing the received initial field of video frame data into a buffer using the first initialized buffer pointer.

8. The program executable by machine of claim 7, wherein the toggling further comprises changing the state of the first initialized buffer pointer.

9. The program executable by machine of claim 7, wherein the toggling further comprises replacing the first initialized buffer pointer with a second initialized buffer pointer having the state different from the state of the first initialized buffer pointer.

10. A video frame data buffering system in a video display system, comprising:

means for initializing at least one buffer pointer to either a first state or a second state to form a first initialized buffer pointer;

means for receiving an initial field of video frame data having either the first state or the second state;

means for toggling the state of the first initialized buffer pointer if a state of the initial field of video frame data is not the same as a state of the first initialized buffer pointer;

means for storing the received initial field of video frame data into a buffer using the first initialized buffer pointer.

* * * * *